United States Patent

[11] 3,631,612

| | | |
|---|---|---|
| [72] | Inventor | Gerhard Westerberg<br>Hastskovagen 7A Lahall 18350, Taby, Sweden |
| [21] | Appl. No. | 882,337 |
| [22] | Filed | Dec. 4, 1969 |
| [45] | Patented | Jan. 4, 1972 |
| [32] | Priority | Dec. 9, 1968 |
| [33] | | Sweden |
| [31] | | 16803/68 |

[54] AN APPARATUS FOR TEACHING PURPOSES
6 Claims, 3 Drawing Figs.

[52] U.S. Cl. .................................................. 35/48 R
[51] Int. Cl. .................................................. G09b 7/06
[50] Field of Search .......................................... 35/9, 48; 340/172.5

[56] References Cited
UNITED STATES PATENTS

| | | | |
|---|---|---|---|
| 3,266,174 | 8/1966 | Bechtol et al. ............... | 35/11 |
| 3,299,254 | 1/1967 | Dobbins et al. ............. | 235/61.7 |
| 3,314,172 | 4/1967 | Boyett ......................... | 35/48 |
| 3,491,464 | 1/1970 | Gray ........................... | 35/48 |

*Primary Examiner*—Robert W. Michell
*Assistant Examiner*—J. H. Wolff
*Attorney*—Bauer and Goodman ABSTRACT: To decrease the number of interconnections necessary between a central comparison and monitor unit and a plurality of student-operated keyboard units, each keyboard unit has a specifically assigned connection code, in the binary system, and is connected according to this code to the wires in a cable; the monitor unit includes a scanning generator, scanning the wires, in binary code; upon coincidence of the scanned code with the connection pattern of a keyboard unit, a transistor in the keyboard unit is unblocked, permitting reading of student-operated keys connected to a second group of wires, preferably also in a binary coded system. A comparator, operated by a pulse generator in cyclical sequence with the scanning, compares the code in accordance with the student-operated keys with a preset code, for recording and display at the monitoring unit.

PATENTED JAN 4 1972  3,631,612
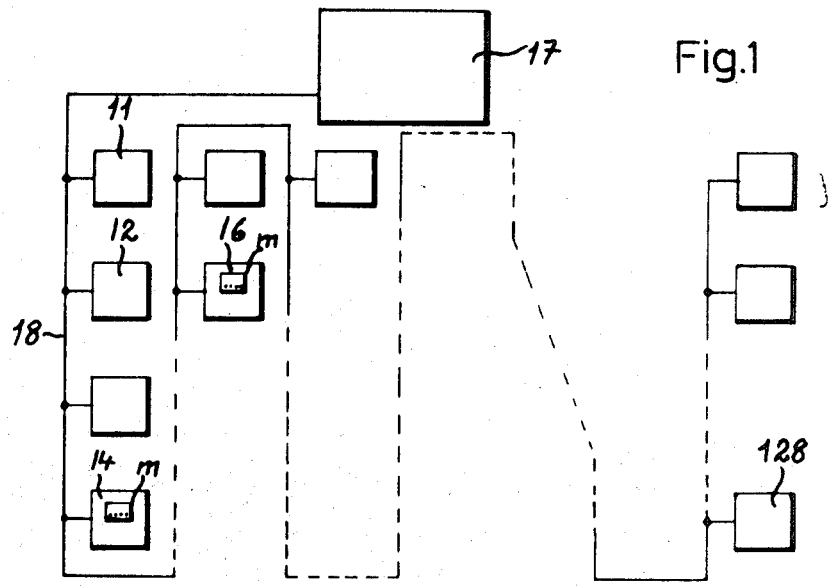
Fig.1
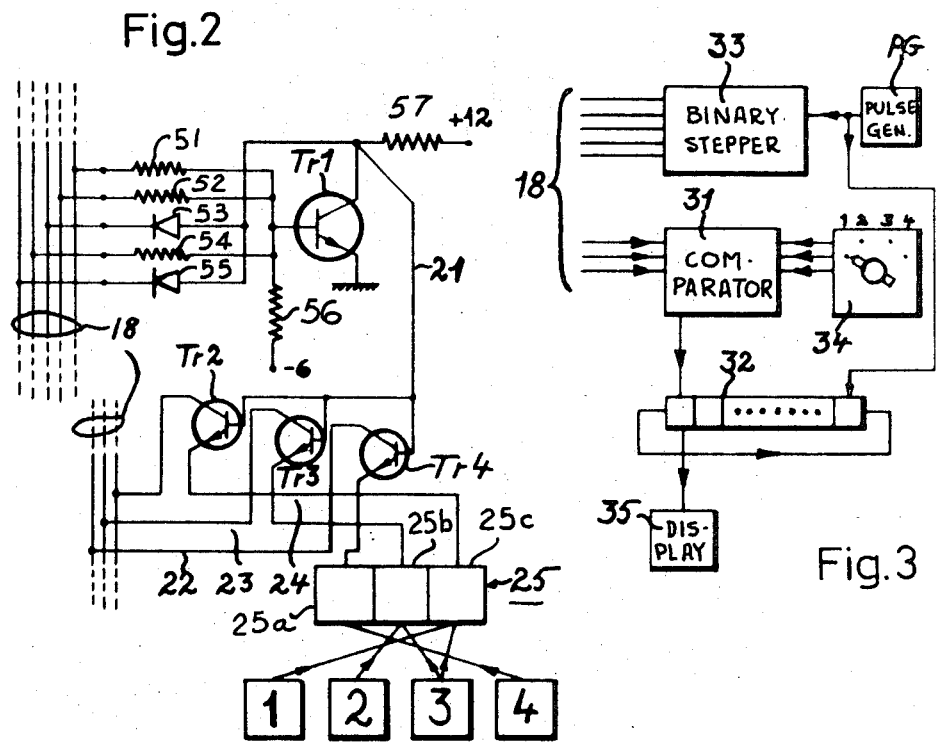
Fig.2
Fig.3
INVENTOR
GERHARD WESTERBERG
BY Bauer & Goodman
ATTORNEYS 3,631,612

AN APPARATUS FOR TEACHING PURPOSES

The present invention relates to a teaching apparatus, and more particularly to an electrical-type teaching apparatus in which a plurality of student-operated keyboards are interconnected to a central monitoring station, for example under the supervision of a teacher.

In one system of teaching machines, questions are presented to students to be answered by operating selected keys of a coded keyboard, the student being given a number of alternatives from which he has to choose the correct one; multiple-choice questions at the end of educational, instructional material lend themselves particularly well to this type of teaching machine. By use of an electronic answering system, the number of students who can utilize the apparatus, and supply their answers by using a keyboard can be substantially increased; additionally, immediate correction of incorrect answers can be signalled to the student, who can also be advised of his total score of correct and wrong replies.

Teaching machines as above briefly outlined usually include, besides the student-operated keyboard at every student's desk, a central or monitoring unit recording the condition of the keyboard, that is the pattern of operation by the students, every time that an answer has been supplied. In order to enable the student to express a reasonable number of choices, the number of keys to be supplied to the student should be as large as possible. If, for example, 100 student-operated units are to be connected, the number of wires, and the cables to supply the interconnections can become excessive and bulky.

It is an object of the present invention to provide a teaching machine system in which the interconnection between individual student-operated keyboards and a central monitoring station can be substantially simplified.

SUBJECT MATTER OF THE PRESENT INVENTION

Briefly, the use of time-sharing technique permits reduction of the interconnection to a single cable of from 10 to 20 wires. By scanning the wires in accordance with a code, for example in the binary system, the keyboard units of the various students can be scanned sequentially, and the answer stored at each position by key operation of the student compared with a stored, or preset code representative of the correct answer. The result of the comparison can then be monitored, stored, and displayed in synchronism with the scanning of the keyboard units, for example by a teacher, to point out correct and incorrect answers and to lead the students to the proper response.

The various keyboards are all identical, and can be connected to the individual wires of the main cable in identically the same way. The wires of the cable are subdivided into two groups, one group, for example of wires permitting a choice of 32 keyboards being used to activate the particular keyboards in binary code, and the other group communicating the state of the keys, as operated by the student, to the central or monitoring unit. Scanning of the first group of wires may be carried out, for example, by bringing each of the five wires, in a binary pattern sequence, in one, or two states of a voltage corresponding to the binary figures "1" and "0."

The connecting pattern of any one of the individual keyboard units is so arranged that when the wires have a voltage pattern applied thereto which matches the assigned binary number of a particular keyboard unit, a gate circuit is activated which permits the keyboards themselves to be connected to the comparator circuit. The first group of wires having the connecting patterns is scanned through binary numbers 00000 to 11111. Since the different keyboard units are connected to the common cable in identical manner, the units need not be assigned, or connected to certain desks, but can be plugged in at random. Thus, the students may use any keyboards which are connected to a suitable free desk. Since the keyboards, and hence the students, are identified by a special connecting pattern which activates the gate circuit, each student can be given an assigned code chart containing a representative binary number, the unit having the proper code being plugged in to the main cable at any suitable location.

The invention will be described by way of example with reference to the accompanying drawings, wherein:

FIG. 1 illustrates, schematically, a teaching system utilizing the concept of the present invention;

FIG. 2 is a schematic fragmentary circuit diagram of a keyboard unit, indicating interconnections;

and FIG. 3 is a schematic fragmentary diagram of a central monitoring unit, illustrating the main parts of the apparatus.

A group of students' desks 11, 12, 14, 16,...128 are connected by means of a cable 18 to a central monitoring unit 17, for example under control of an instructor. Cable 18 may, for example, contain 10 wires, five of which are in a first group to select one of 32 keyboard units schematically indicated at $m$ at positions 14 and 16; three more wires are used to transmit an answer by the student to the central monitoring unit 17, and two wires are used as source of potential and return, or ground line respectively.

The keyboard units $m$ are illustrated in detail in FIG. 2; they are connected in such a manner that each one is assigned a particular individual distinguishing connecting code. For a five-wire selecting circuit (permitting a selection of 32 individual positions), five connecting elements are used; some of those are resistances and some are diodes. The number of resistances and diodes, respectively, and the pattern in which these elements are connected to the first group of wires of the cable will identify the particular keyboard circuit unit. Thus, the keyboard circuit unit illustrated in FIG. 2 can be connected at any position and at any desk of FIG. 1, and will still remain identified always by its individual connecting pattern; the monitoring unit 17 thus can monitor any particular student having the code of the keyboard unit assigned, regardless of individual desk position.

The keyboard circuit shown in FIG. 2 represents 10100 in a binary coded system. Three of the five wires are connected to resistances 51, 52, 54 which, in turn, are connected together and to the base of a transistor Tr1. Another resistance 56 connects the base of transistor Tr1 to a source of negative potential, for example −6 volts. Two of the five wires are connected over diodes 53, 55 to the collector of transistor Tr1, and then over a resistance 57 to a source of positive potential, for example +12 volts. If the five wires have correct voltages applied thereto, such as 12, 0, 12, 0, 0 volts respectively, that is counting from left to the right in FIG. 2, transistor Tr1 will be blocked and positive voltage transmitted to the bases of three further transistors Tr2, Tr3, Tr4. Transistor Tr1 forms a gate circuit permitting activation of the other three transistors, and blocking application of positive voltage to the bases unless the voltage pattern over the lines of the first group of wires of cables 18 are correct, that is, matches the interconnecting pattern of the resistances and diodes, respectively, connected to transistor Tr1. The emitter-collector paths of transistors Tr2, Tr3 and Tr4 are included in the three connecting wires 22, 23, 24, and connected to a second group of wires of cable 18 on the one hand, and to a chain 25 of flip-flops 25a, 25b, 25c. The flip-flop chain has its three stages 25a, 25b, 25c connected to four pushbuttons 1, 2, 3, 4. Button 1 is connected to flip-flop 25c, button 2 to the center flip-flop 25b, button 3 to both the center and right-hand flip-flops 25b, 25c and button 4 to flip-flop 25a. A student may operate any one of the buttons; he thus has four possibilities to choose when answering a question; these possibilities can be assigned code numbers 001, 010, 011, and 100. The outputs of the three flip-flops will apply corresponding signals to the three connections 22, 23, 24, if and only if a scanning voltage pattern is applied to the first group of wires which matches the connection pattern of elements 51 to 55.

The cable 18 is connected to the monitor unit 17, as best seen in FIG. 3, where the five wires forming the first group, and the three wires forming the second group are again shown separately. The five wires in cable 18 are connected to a binary stepping switch 33 operated by a pulse generator, and applying voltage pulses from a source to the wires in binary sequential scanning sequence. Stepping switch 33 may be of any kind, for example a group of multivibrator circuits applying to the five wires a cyclically changeable pattern of voltages representative of the value 00000 to the value 11111; other progressive circuits, such as ring counters and the like may also be used. One of these voltage patterns will be representative of the value 10100, which will be the value which unblocks transistor Tr1 (FIG. 2), to activate the circuit of transistors Tr2, Tr3, Tr4. The three wires, then, of the second group of the cable 18 will be connected to a comparator circuit 31. Comparator circuit 31 has applied thereto a voltage pattern representative of a binary number as determined by a setting element, for example under teacher control, and shown as switch 34 having four positions. Switch 34 will be set to the correct answer. Comparator circuit 31 is connected to a stepping counter circuit 32, which preferably has inherent storage functions at each count position, and preferably includes separate storage capacity for each count. Alternatively, another stepping switch with separate storage capacity at each step in the progression can be used. The counter, or stepping switch 32 is under control of the pulse generator 33, to operate counter 32 in synchronism with the stepping of switch 33.

At the time that the gate circuit of any one of the keyboards m is opened, the answer encoded by key-operation of the student, for example button 1 in FIG. 2, is applied to the comparator 31. At the same time, the appropriate memory element connected to unit 32 and assigned to the particular code of the student is likewise activated. If the answer is correct, that is if the answer set in switch 34 corresponds to the answer given by the student, a "1" can be added to the contents of the memory element at the particular stepping position of unit 32; otherwise, that is if the answer is wrong, no addition occurs or, upon proper programming, a subtraction from previously correct answers can be made. The contents of the specific memory element being connected can be displayed on a display unit 35, such as a screen at the instructor's desk; remote indication, for example by a single line connected to all the student's desks, and activated from line 21 connected to transistor Tr1 can be used to indicate to the student whether his answer was right or wrong. Line 21, of course, will be active only at the particular desk which was, at the time, scanned by the binary stepping switch 33. Suitable time delay, or locking-type relays may be used to hold a particular indication for the student, or for the teacher, although the binary stepping switch may have progressed to another position. Thus, both teacher and student can follow the results of answers to multiple-choice questions, permitting a large number of students to be simultaneously connected to a single monitoring station, while using only a minimum number of wires and interconnecting cables and still providing flexibility of movement and assignment. Since adding two wires to the system will quadruple the number of students who can be monitored from a single monitoring station, the flexibility of the system, and its capability for expansion as demand increases is substantial.

The present invention has been described in connection with a simple four-choice-type keyboard for student operation; various changes and modifications may be made within the inventive concept to accommodate various design and capacity requirements.

I claim:

1. Apparatus for teaching purposes comprising
   a plurality of student stations (11, 12, 14, 16...128) each having keyboard units (m) including student operable means (1, 2, 3, 4; 25);
   a monitoring unit (17) including means to preset a code and having a comparator (31) having the preset code applied as one input thereto;
   and interconnection lines (18) interconnecting the monitoring unit and the student stations, the interconnecting lines including
   two groups of wires, the first group comprising control wires providing in a binary pattern a unique arrangement of wires for each student station and at least one power wire, and the second group forming information wires connected to the student-operable means and further connected as another input to said comparator (31);
   each individual student station including a gate circuit (Tr1), resistors (51, 52, 54) and diodes (53, 55) interconnecting the gate circuit to the control wires in accordance with a binary coded pattern in which each student station is uniquely connected by the resistors and the diodes in accordance with a uniquely assigned individual code, and means (56, 57) interconnecting the gate circuit to the power wire;
   means cyclically, progressively scanning said control wires through all possible binary patterns, the gate circuits of the respective student stations connecting the student-operable means to the information wires being activated when said unique binary pattern on the control wire and the power wires corresponds to the connection code of the resistances and diodes of the respective station, the comparator (31) comparing activated information wires as determined by student keyboard operation, with said preset code.

2. Apparatus according to claim 1, wherein said means cyclically scanning said control wires comprises a pulsed voltage source (PG) and a stepping circuit (33). 14

3. Apparatus according to claim 1, including memory means (32) connected to and activated in synchronism with the cyclic scanning means, and further connected to said comparator (31) and recording whether the comparison was positive or not, with respect to each scanned connecting code.

4. Apparatus according to claim 1 wherein each gate circuit comprises a blocking transistor (Tr1) normally inhibiting connection of said student-operable means to said information wires unless unblocked upon application of said unique binary pattern to said control wires matching the connection code of resistances and diodes of the particular student station.

5. Apparatus according to claim 1 wherein said student-operable means comprises a plurality of transistors (Tr2, 3, 4) interconnected to said blocking transistor (Tr1) and said information group of wires and capable of being activated upon unblocking of said blocking transistor (Tr1).

6. Apparatus according to claim 5, including student-operated keys (1, 2, 3, 4) connected to activate said plurality of transistors in a predetermined pattern upon unblocking of said blocking transistor.

* * * * *